United States Patent [19]

Farrell

[11] 3,985,485

[45] Oct. 12, 1976

[54] BLOW MOLDING APPARATUS WITH MULTIPLE CYCLE CORE RODS

[75] Inventor: John J. Farrell, Green Brook, N.J.

[73] Assignee: Consupak, Inc., Morristown, N.J.

[22] Filed: Nov. 28, 1975

[21] Appl. No.: 635,898

Related U.S. Application Data

[63] Continuation-in-part of Ser. No. 476,092, June 3, 1974, Pat. No. 3,923,441.

[52] U.S. Cl. .................... 425/242 B; 425/DIG. 208; 425/DIG. 213
[51] Int. Cl.² ......................................... B29C 17/07
[58] Field of Search ............... 425/242 B, DIG. 208, 425/DIG. 211, DIG. 203, DIG. 209, DIG. 213, 387 B

[56] References Cited
UNITED STATES PATENTS

| | | | |
|---|---|---|---|
| 2,819,490 | 1/1958 | Froot | 425/DIG. 208 |
| 3,923,441 | 12/1975 | Farrell | 425/242 B |

*Primary Examiner*—Richard B. Lazarus
*Attorney, Agent, or Firm*—Marvin Feldman

[57] ABSTRACT

This blow molding apparatus applies a coating to a core rod and then moves the core rod into an inactive or temperature conditioning position in which it travels through one cycle or more cycles of the apparatus before being brought into interaction with a blowing and stripping station during another cycle. This travel of the parison with the core rod in an inactive position allows time for the parison to be brought to a temperature for biaxial orientation before blowing the parison. The cooling can also be used to bring the parison to a condition at which a second coating can be applied over the parison to make a laminated container or other article. In one preferred construction a plurality of core rods are rotatably mounted to an indexing turntable for movement between active and inactive positions, wherein several core rods remain in the inactive or conditioning mode through several revolutions of the indexing turntable.

17 Claims, 10 Drawing Figures

BLOW MOLDING APPARATUS WITH MULTIPLE CYCLE CORE RODS

This application is a continuation-in-part of U.S. application Ser. No. 476,092, filed June 3, 1974, now U.S. Pat. No. 3,923,441.

This invention relates to injection blow molding. Specifically this invention relates to injection blow molding wherein the injection molded parisons are condition cycled prior to blow molding to the finished article.

In blow molding apparatus, the coating applied to the core rods is generally applied by injection molding and the material is at very high temperature as it comes from the injection mold. In order to obtain biaxial orientation of the plastic during the blowing operation, the plastic must be cooled to a temperature approaching its hardening or crystallizing temperature. If the apparatus is operated slowly enough to permit the parison to cool to orientation temperature while travelling from an injection mold to a blowing mold, the production rate of the apparatus is greatly impaired.

In the biaxial orientation injection blow molding of certain polymers, such as a polypropylene, substantial periods of time are required to cool the parison from its injection temperature to the temperature or temperature range at which orientation can be induced into the polymer structure. This lengthy conditioning period is generally brought about by virtue of the low thermal conductivity and diffusitivity of such polymers.

This invention obtains the necessary time for controlling the temperature of the parison without reducing the speed of the machine cycle. This result is accomplished by having each core rod, after being coated with a parison, move into an inactive position before reaching the blowing station. The core rod remains in this inactive position, where it does not interact with any stations of the machine, and passes through at least one full cycle or more of travel and back past the station at which it was coated with the parison and to the location at which it moves into inactive position.

Each successive core rod is then returned to its active position and passes on to the blowing station and stripper station in accordance with conventional operation.

During the extra cycle or cycles of movement of each core rod, its temperature can be controlled so that the parison will be at its orientation temperature when it reaches a blowing station. The time can also be used to reduce the temperature of the parison to a low enough temperature so that another coating of plastic can be applied or injection molded over the cooled parison without impairing the cooled parison, if it is desired to make a molded article of laminated construction.

Where the apparatus is constructed for biaxial orientation of the blown article, the blowing is preferably carried out in two stages. The parison is first introduced into a blowing mold which is shaped so that the blowing in this first blowing mold expands the parison to a much greater degree in a direction lengthwise of the core rod for orientation in that direction. The partially blown article is then carried to a second blowing operation in the second blowing mold increases the diameter of the blown article and thus provides orientation in a circumferential direction.

Where a laminated product is to be blown, a second injection mold is substituted for the first blowing mold and the core rod with two layers of plastic on it is then moved to a blowing station where both layers are blown simultaneously to produce a laminated container or other article. In order to obtain more control of the change in temperature of the parison while moving through the cycle for temperature control, a chamber is provided with an open side into which the core rods that are in inactive position can travel while subject to contact with fluid used to control the temperature of the parison. Usually this fluid will be at a substantially lower temperature than the plastic of the parison since the temperature control rquired for orientation or for the extrusion of a subsequent layer of plastic, is a reduction in temperature. The temperature control fluid, usually air, is circulated by control means that are adjustbale to regulate the temperature of the temperature control fluid.

In the preferred embodiment of the invention, the core rods extend outwardly from an indexing table when in active position for cooperation with the coating station, blowing station and stripper station. The core rods are moved into inactive positions by swinging them upwardly or downwardly into positions where they extend in directions having substantial components that are parallel to the axis of rotation of the indexing table. Temperature controlling chambers are provided both above and below the indexing table so as to receive the core rods that extend downwardly as well as those which extend upwardly. The chamber has a wider portion at a location between the coating station and the first blowing station so that there is space for core rods to swing between active and inactive positions at this wide space between the coating and blowing stations.

In another preferred embodiment of the invention a plurality of core rods are mounted on a rotatable shaft rot toation in one direction so that at each transition station the core rods are rotated through the same angle whereby several core rods remain in the inactve or conditioning mode during several revolutions of the turntable. Temperature controlling chambers are provided below, above as well as within the plane of the turntable so as to receive those core rods undergoing conditioning. The transition station for rotating the core rods is located after the preliminary blow station and before the longitudinal stretch station. In this latter preferred mode the stations are preferably in order, injection molding; preliminary blow; transition; longitudinal stretching; blow molding; and stripping. This sequence of operations in combination with the plurality of rotatable core rods is particularly suitable for biaxial orientation injection blow molding.

Other objects, features and advantages of the invention will appear to be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
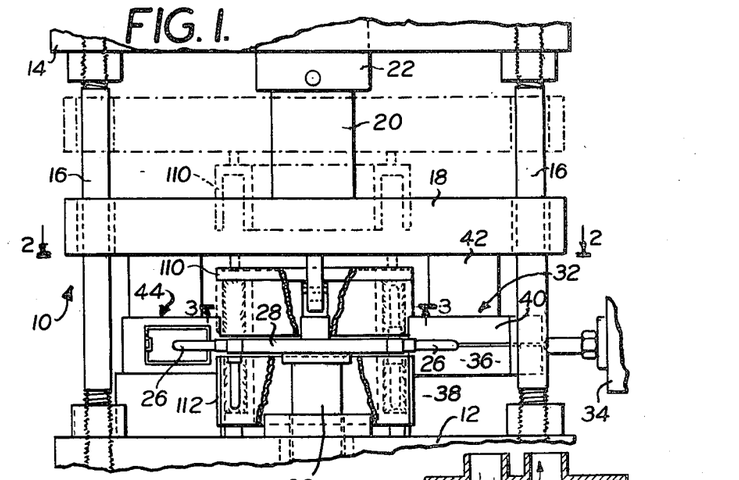
FIG. 1 is a diagrammatic, fragmentary, side elevation of a blow molding apparatus made in accordance with this invention.

FIG. 1 shows a blow molding machine 10 having a frame which includes a base plate 12, and an upper frame section 14 connected to the base 12 by columns 16. A movable platen 18 is moved up and down along the columns 16 by a platen ram 20 having a hydraulic motor 22 connected to the upper frame 14.

Core rods 26 are carried by an indexing table 28 supporting by a piston rod 30 which extends upward from a hydraulic motor.

The blow molding machine has a coating station comprising an injection mold 32 into which core rods 26 extend to receive a parison which is injected into the mold 32 from a plasticizer 34. The mold 32 has a fixed lower section 36 secured to a fixed platen 38 attached to the base 12. The mold 32 also has an upper movable section 40 which is raised and lowered with respect to the fixed section 36 to open and close the mold 32. The upper section 40 is attached to the movable platen by a connecting structure 42 so that the section 40 of the mold moves as a unit with the movable platen 18.

The molding machine can also include a blowing station comprising a blow mold 44 which is made in two sections like the injection mold 32 attached to the base 12 and movable platen 18 in the same way as the injection mold.

Figures 2, 3, 7:
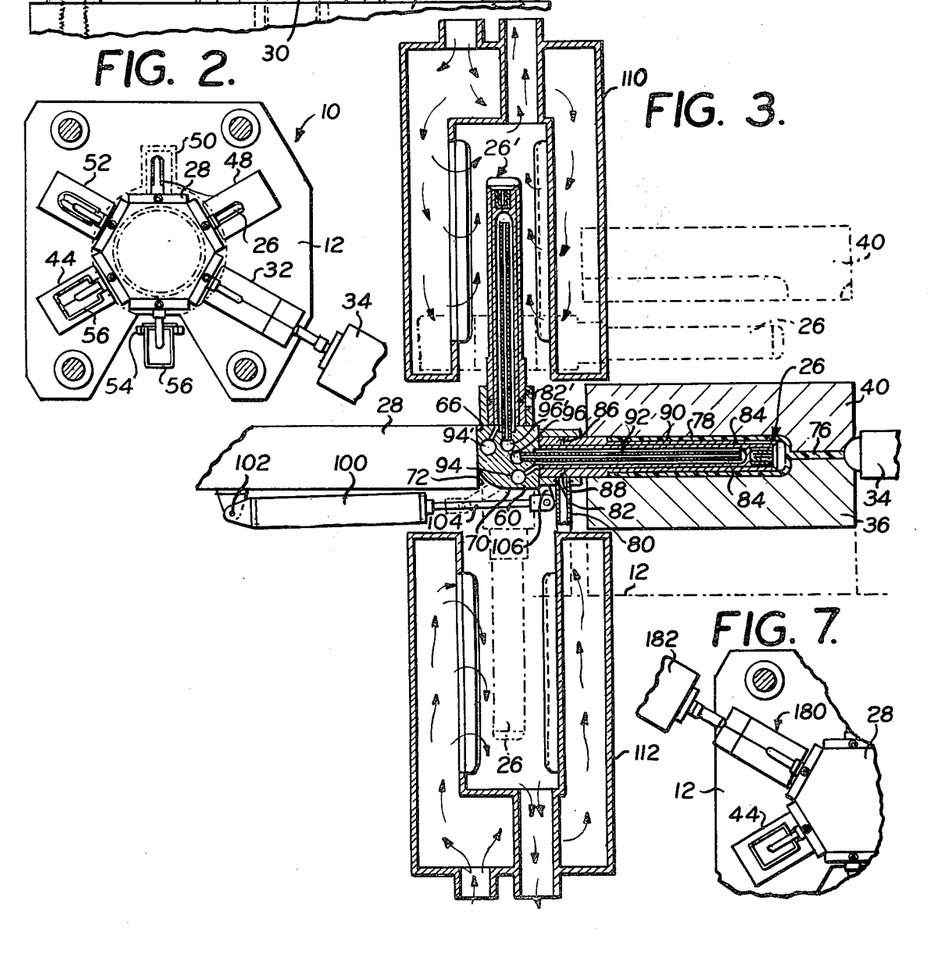
FIG. 2 is a sectional view taken on the line 2—2 of FIG. 1.
FIG. 3 is a fragmentary view, partly in section, and partly broken away, on an enlarged scale showing details of the apparatus shown in FIGS. 1 and 2, the sections through the temperature control chambers being taken on the line 3—3 of the reduced scale drawing of FIG. 5.
FIG. 7 is a fragmentary view showing a modification of the structure shown in FIG. 2.

FIG. 2 shows the molding machine 10 to be a six-position machine. The indexing head 28 is hexagonal and there are core rods 26 extending from each of the faces of the table 28.

There are six operational stations around the table 28, spaced angularly from one another by angles of 60° corresponding to the angular relation of the side faces of the table 28. The first station is the coating station with the injection mold 32. This injection mold can be replaced with other means for coating the core rods but an injection mold is used in the preferred embodiment of the invention. The second operational station, indicated by the reference character 48, is a conditioning station in which the parison on the core rod may be initially cooled, and in which the parison is blown to a small extent to make it enough longer than the core rod to prevent shrinkage of the parison from pulling the neck end of the parison away from the conventional flange at the neck end of the core rod.

The third station is a transition station 50 at which core rods are moved between active and inactive positions as will be more fully explained in connection with other figures.

The fourth station is a first blowing station comprising a blow mold 52 in which the mold cavity is shaped so that the parison blown in this mold 52 is stretched principally in a direction lengthwise of the core rod to obtain orientation of the plastic in that direction.

The next operational station is a second blowing station comprising the blow mold 44; and the last station is a stripper station 54 at which an article 56 blown in the blow mold 44, is ejected from the core rod so that the core rod is ready for another parison when it reaches the injection mold 32.

Figure 6:
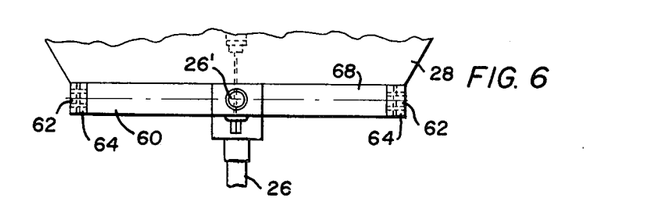
FIG. 6 is a fragmentary top plan view showing the connection of a group of core rods to one face of the indexing table; and also showing the power mechanism for moving the core rods between active and inactive position.

FIG. 3 shows the way in which the core rods 26 are supported from the table 28. Each core rod 26 is connected with a fitting 60 which has axles 62 extending from its opposite ends. These axles 62 extend into bearings 64 rigidly connected with a face of the table 28 as shown in FIG. 6. The core rods 26 extend from one side of the fitting 60 and other core rods 26' extend from another face of the fitting 60 and at an angle of substantially 90° to the core rods 26.

In FIG. 3, the core rod 26 is shown in its active position. The core rod 26' is shown in its inactive position. With the parts in the positions shown in full line in FIG. 3, one face of the fitting 60 is in contact with an area of the table 28 which comprises a stop 66 for preventing counter-clockwise movement of the fitting 60 any further than the position occupied in FIG. 3.

When the fitting 60 turns in the bearings 64 (FIG. 6) the rotation is about an axis 68. This causes a face 70 of the fitting 60 to come in contact with a stop face 72 which constitutes a continuation of the face 66 on the side of the indexing head 28. The core rod 26 is moved into the dotted line position shown in FIG. 3 and the core rod 26' is moved into the full line position of the core rod 26 shown in FIG. 3. Thus the core rod 26 is moved from active to inactive position and the core rod 26' is moved from inactive to active position. This swinging movement of the core rods between active and inactive position does not occur when the core rods are at the mold stations because the lower and upper sections 36 and 40, respectively, of the mold 32 would interfere with the swinging movement of the core rods. The core rods are shifted between active and inactive positions at the transition station which will be explained more fully.

When the plasticizer 34 has injected plastic 76 into the injection mold 32 to form a parison 78 on the core rod 26, the other mold section 40 moves upward and the core rod 26 also moves upward, as shown in broken lines in FIG. 3. The table 28 is then free to turn and carry the core rods 26 and 26' to the next station. As the core rod 26 moves upwardly, it moves away from an air supply pipe 80 which is at a fixed position with respect to the base 12 so that the air supply pipw 80 will move into a sealed inlet orifice 82 in the neck of the core rod 26 or a similar orifice 82' if the core rod 26' is in active position.

There are air passages 84 extending lengthwise through the core rod 26 and communicating with the air supply pipe 80 through an annular chamber 86 in the core rod opening into the orifice 82 through a radial passage 88. Air is supplied through the pipe 80 to the air passages 84 only at the time when the parison 78 is to be blown. The core rod 26 has a hollow chamber 90 and a tube 92 extends most of the length of the chamber 90, and this tube 92 is spaced from the sides of the chamber so as to make the chamber 90, outside of the tube 92, of annular cross section. Temperature control fluid passes into this annular chamber 92 from a supply passage 94 in the fitting 60. This temperature controlling fluid travels to the end of the tube 92 and then enters the open end of the tube 92 and flows back to another passage 96 in the fitting 60. Supply and exhaust of fluid to and from the passages 94 and 96 is through hoses (not shown) at the ends of the fitting 60.

The construction of all of the core rods 26 and 26' is similar and provision for supplying blowing air and temperature controlling fluid is the same for all of the core rods; but there are separate passages 94' and 96' for the core rods 26' since the cooling time for these different core rods will not always be the same.

The means for moving the core rods 26 and 26' between their active and inactive positions includes a cylinder-and-piston motor 100 connected with the table 28 by a pivot connection 102. The motor 100 has a piston rod 104 which connects with a crank 106 rigidly attached to the fitting 60. When the piston rod 104 moves to the right in FIG. 3, the core rod 26' is moved into inactive position and the core rod 26 into active position. When the piston rod 104 moves to the left (clcokwise) in FIG. 3, the core rod 26' is moved into active position and the core rod 26 into inactive position.

The core rods that are in their inactive positions, can cool as they travel through a cycle in a manner which will be explained. In the preferred construction, however, there is a chamber 110 (FIG. 1) into which the upwardly extending core rods 26' extend as they travel with the table 28 while the table moves intermittently about its axis of rotation. There is another chamber 112 in position to receive the downwardly extending core rods. These chambers 110 and 112 are supported from the movable platen 18 and the base 12, respectively. Thus the upper chamber 110 rises into the dotted line position shown in FIG. 1 when the molds 32 and 44 open and the table 28 rises to lift the core rods clear of the bottom sections of the molds.

Figure 4:
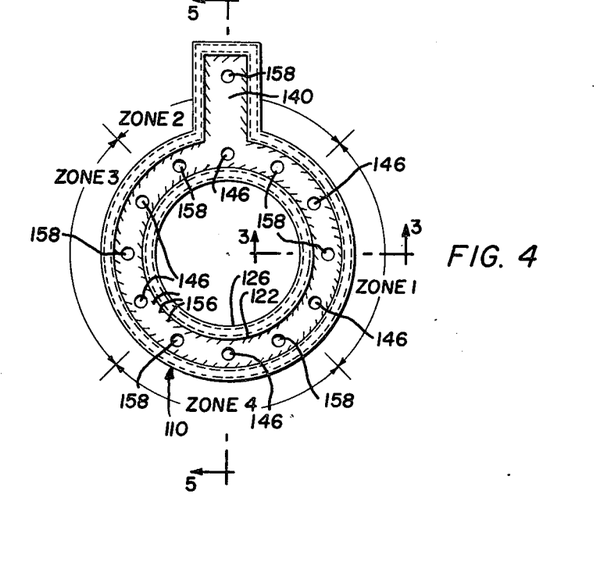
FIG. 4 is a diagrammatic top plan view of the temperature control chamber for the core rods which extend upwardly.
Figure 5:
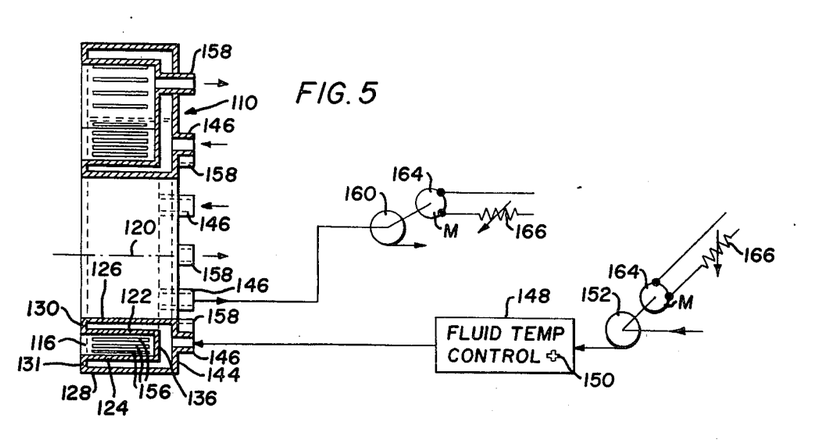
FIG. 5 is a sectional view taken on the line 5—5 of FIG. 4.

The chamber 110 is shown on a larger scale in FIG. 4 and in section in FIG. 5. The chamber 112 is of the same construction but is oriented in the opposite direction so as to receive downwardly extending core rods instead of upwardly extending core rods.

FIGS. 4 and 5 shown the temperature control chamber 110. The part of the chamber through which the core rods travel as the table rotates is a space 116 which has a center of curvature at the axis of rotation of the table, this axis being designated in FIGS. 4 and 5 by the reference character 120. There are cylindrical walls 122 and 124 defining the inner and outer limits of the space 116; and the space 116 is closed at its upper end by a top wall 126.

There is a jacket formed around the walls 122 and 124 by an inner wall 126 and an outer wall 128 which are evenly spaced from the walls 122 and 124, respectively, around the entire perimeter of the chamber 110. This jacket is closed at its lower end by an annular wall 130 and another wall 136 which is also annular except at a transition station 140 where the space 116 widens out far enough to permit the core rod to swing into and out of the space 116. The jacket is closed at its upper end by a wall 144.

Supply ducts 146 open through the top wall 144. Fluid for temperature control is supplied to the ducts 146 from fluid temperature control means 148 which have a temperature control adjustment 150 and a blower 152 for forcing air through the fluid temperature control means 148 and through the supply ducts 146. The fluid temperature control means 148 is shown connected with only one of the supply ducts 146; but it will be understood that it includes a manifold for supplying temperature control fluid to all of the supply ducts 146 in the preferred constructon. Separate fluid temperature means can be provided for each supply duct so that the temperature can be different at dfferent locations around the chamber 110, but for most purposes this is entirely unnecessary.

There are louvers 156 in the walls 122 and 124. The fluid supplied through the ducts 146 into the jacket around the space 116 flows through the louvers 156 and into contact with core rods that are travelling along the annular space 116.

Temperature controlling fluid can exhaust from the chamber 110 through the lower open end of the space 116 through which the core rods extend into the chamber. In the preferred construction, however, the temperature controlling fluid exhaust from the space 116 through exhaust ducts 158 which extend downwardly through the wall 144 and through the wall 126. These exhaust ducts are shown connected with an exhaust blower 160. The exhaust blower 160 is shown connected with only one of the exhaust ducts 158, but as in the case of the temperature control fluid supply, the exhaust ducts 158 are preferably connected with a manifold (not shown) so that the exhaust blower 160 withdraws temperature control fluid from the various exhaust ducts 158 located at angular spacing around the angular extent of the space 116 of the temperature control chamber 110. The direction of flow of the temperature control fluid is indicated by small arows in FIGS. 4 and 5.

The blowers 152 and 160 are perferably driven by motors 164 having speed controllers 165 for regulating the rate of flow of the temperature control fluid to and from the chamber 110.

Reviewing the operation of the machine, the core rod 26 in FIG. 3 has a parison applied to it in the injection mold 32. After the mold opens and the table lifts the core rod clear of the lower mold section 36, as already described, the table 28 turns to an angle of 60° and carries the core rod 26 to the conditioning station 48. The table 28 lowers to position the core rod 26 at the conditioning station; and on the next 60° movement of the table 28, the core rod 26 is carried to the transition station 50.

At the transition station 50, core rod 26 moves downward into the dotted line position shown in FIG. 3 and this is what is termed herein the "inactive" position. This downward swinging movement is made possible by the extra width of the chamber 112 at the transition station, as illustrated in FIG. 4 of the drawing. With the core rod extending downwardly, substantially parallel to the axis of rotation of the table 28, the core rod 26 is moved with intermittent movements of 60° each, past the first blowing station 52, the second blowing station 60, the stripper station 54, the coating station 32, and the conditioning station 48 back to the transition station 50. The core rod 26 is in its inactive position during all of this movement and is, therefore, within the cylindrical space 116 of the chamber 112 for a full cycle of movement of the table 28.

During this travel of the core rod 26 from the transition station 50 and around the full angular extent of the blow molding machine, the parison on the core rod 26 is subjected to the temperature controlling effect of the fluid supplied to the chamber 112. Ordinarily this treatment will be designed to cool the plastic of the parison to its orientation; that is to the temperature just above the temperature at which the plastic begins to harden. Upon completion of its cycle of travel from the transition station 50 and back to that station, the core rod 26 will be moved back to its active position; the position in which it extends outward from the table 28 so as to have an active correlation with the other stations that surround the table 28.

The next 60° movement of the table 28 carries the core rod 26 to the first blowing station 52 where the parison is partly blown and stretched mostly in a direction parallel to the axis of the core rod, as previously explained.

The next movement of the table 28 carries the partially blown parison on the core rod 26 to the second blowing station 44 where the parison is blown fully to form the article 65 which is produced by the machine shown in the drawing. The next movement of the table carries the core rod 26 to the stripper station 54 where the article 56 is discharged from the core rod 26; and the next intermittent movement carries the core rod 26 back to the injection mold 32 to start another cycle.

If the apparatus shown in FIG. 2 is to be used to make a laminated article, then the first blowing station 52 is replaced by a second coating station comprising an injection mold 180 (FIG. 7) attached to the base 12 by a fixed platen in the same way as the mold 32 already described.

As a result of a full cycle of rotation of the core rod in an inactive position, the parison on the core rod has cooled enough to permit a second parison to be injected over it as an outer layer without impairment of the first parison. The plastics for the outer parison is injected into the mold 180 by a plasticizer 182 which can be of the same construction as the plasticizer 34 previously described.

On the next movement of the table 28, the double layer of laminated parison on the core rod is moved to the blowing station 44 where the two layers of the parison are blown simultaneously to form a laminated, blow molded article. The next movement of the table brings this laminated article to the stripper station where it is pushed off the core rod so that the core rod is ready to return to the first coating station 32 for injection of another parison.

Figure 8:
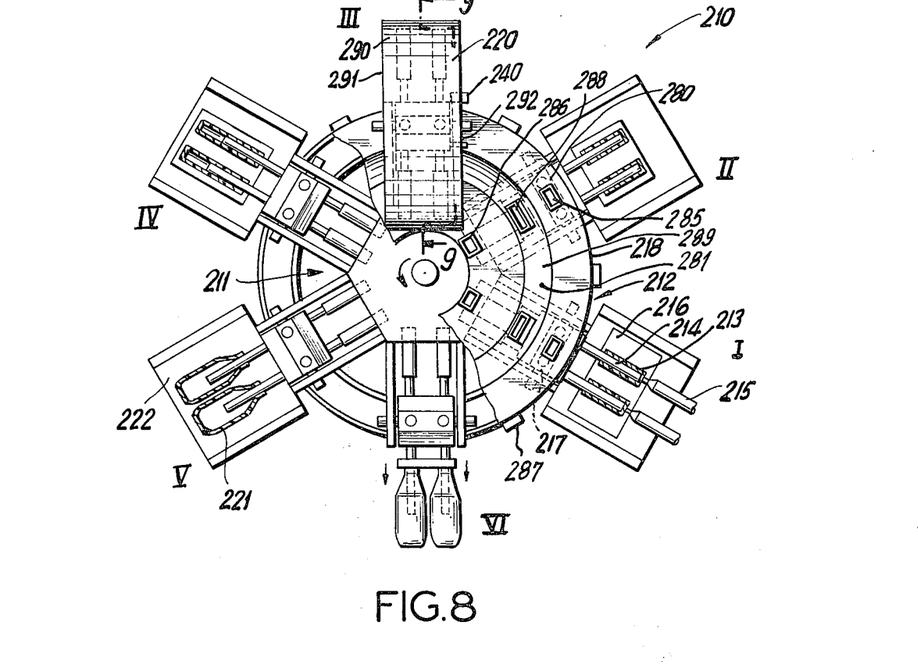
FIG. 8 is a plan view taken along the mold split line of another embodiment of the invention with partial chamber construction.
Figure 9:
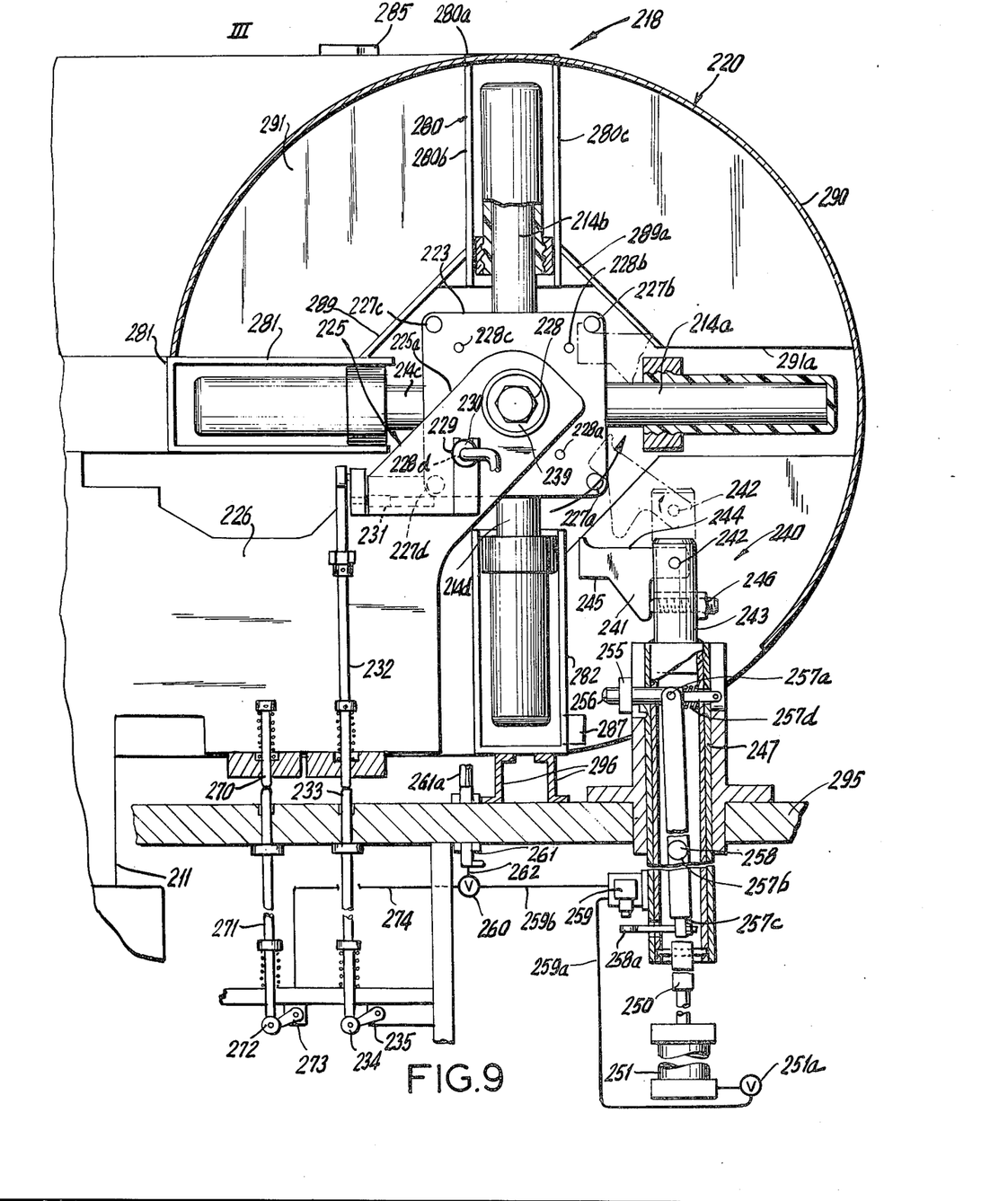
FIG. 9 is a sectional view taken on line 9—9 of FIG. 8.
Figure 10:
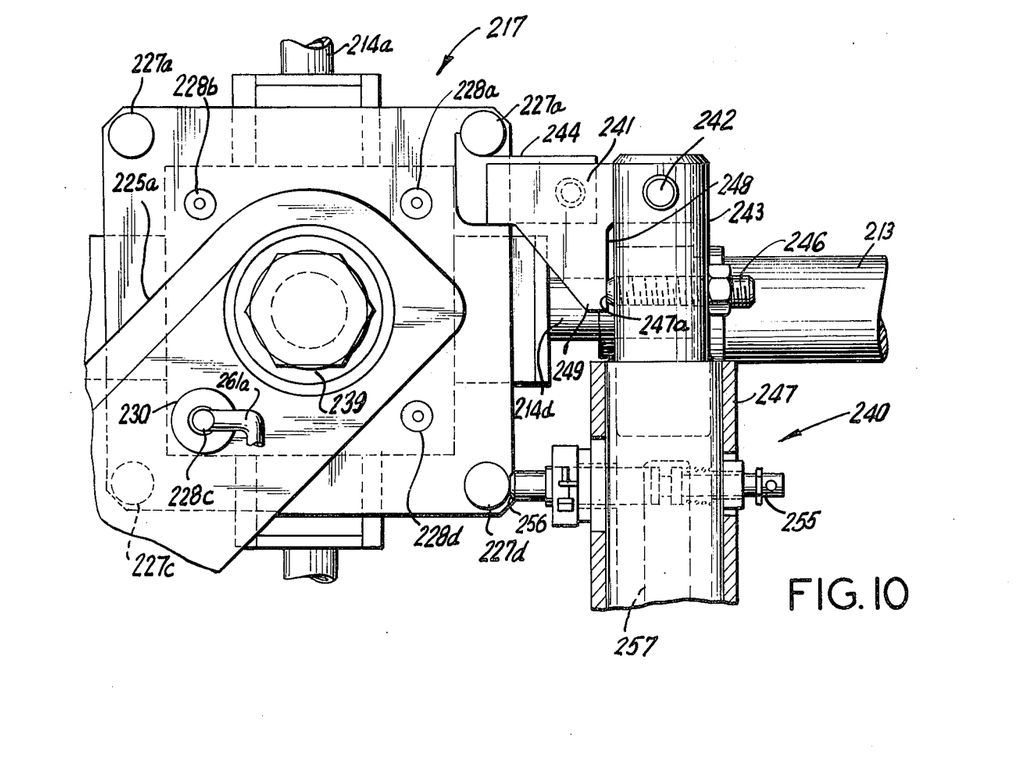
FIG. 10 is an enlarged sectional view of a portion of FIG. 9.

Referring to FIGS. 8–10 there is shown another embodiment of this invention wherein a plurality of core rods may be rotated at the transition or changeover station so as to substantially increase the temperature conditioning time for any parison. This increased temperature conditioning period is useful in conditioning certain polymers such as polypropylene, to its orientation temperature so that the temperature throughout the parison is at its orientation temperature prior to axial stretching and radial expansion to form a biaxially oriented hollow article, such as a container.

Referring now specifically to FIG. 8 there is shown the six-station machine 210, comprising a rotatable indexing turntable 211, with six equiangularly spaced core mountings 212 (typical), disposed at an injection molding station I, a preliminary or partial blow station II, a transition station III, a longitudinal stretch station IV, a blow molding station V, and a stripping station VI. At station I, a parison 213 (typical) is injection molded on core rod 214 (typical) by injector 215 within injection mold 216, in the well known manner. Actually two parisons are molded simultaneously on two core rods. Said core rods are rotatably mounted on a rotatable mounting 217; there being shown four faces of the mounting, with two coresper face for a total of eight core rods on each mounting 217.

With two parisons and core rods undergoing injection molding at station I, the remaining six core rods at that station undergo temperature conditioning in chamber or plenum, generally designated as 218, as will be more fully discussed hereinafter. The two core rods undergoing injection molding are horizontally outwardly disposed from the turntable and are said to be in the active mode, whereas the remaining six core rods are as stated in the inactive or temperature conditioning mode.

After injection molding the two active core rods with parisons are horizontally rotatably indexed to station II whereat the parisons are positioned in molds and each parison is slightly partially blown to overcome the shrinkage of the parison away from the core rod, and prevents the parison from sticking to the core rod and producing non-uniform product in subsequent blow molding at station IV.

After partial blowing of the parison the active core rods are then horizontally rotatably indexed to station III, whereat the active core rods with parisons are vertically rotated to an inactive or temperature conditioning position and one pair of inactive core rods is simultaneously rotated from a temperature conditioning mode to the active position previously occupied by the aforesaid core rods and parisons. With each indexing, a vertical rotation takes place at the transition station III, and each core rod undergoes one complete vertical rotation with four revolutions of the turntable 211. As shown, the chamber 218 is formed with an extension portion 220 so as to permit such vertical rotation. This latter embodiment is principally related to the construction, arrangement and operation of the apparatus at station III, and in conjunction with the other stations, as will be further discussed hereinafter.

After vertical rotation at the transition station, the now actively positioned core rods are transferred to the longitudinal stretch station IV whereat the active parisons at the polymer orientation temperature undergo axial stretching and concommitant axial orientation. The apparatus and operation at station IV is similar to that described in U.S. Pat. No. 3,905,738.

After axial stretching the active core rods and parisons are transferred to the blow molding station V to be blown into the hollow article, such as a container 221 in blow mold 222. After blow molding, the core rods with the containers are transferred to the stripping station VI, whereat the containers are removed from the core rods in the well known manner. Thereafter the empty core rods in the active position are returned to station I to begin a new cycle.

Referring now to FIGS. 9 and 10 there is shown the apparatus at station III. Rotating core rod support 217 comprises a square rotatable block 223, rotating on shaft 224. Also mounted on shaft 224 is a yoke 225 which straddles the block 223. One arm 225a of yoke 225 is shown in FIG. 9, and the yoke is integrally connected to support frame 226 which is mounted to the rotatable indexing turntable 211.

In this manner of construction turntable 211 rotates in the well known manner and with its rotation, frame 226, yoke 225 core rod support 217 and mounted core rods 214a, 214b, 214c, 214d rotate as well. The indexing action comprising raising the turntable half the distance of the mold openings to free the parison and container from the respective molds before horizontal rotation and after the turntable has completed its index, the turntable will lower the active core rods into the molds. Once indexed, the core rods 214 are stopped at one of the stations. It is to be borne in mind that the construction of one core rod support is typical of each of the core rod supports.

Block 223 is formed with four equally radially spaced, equiangularly spaced pins 227a, 227b, 227c and 227d, projecting from the surface of block 223, for purposes hereinafter appearing. The angle formed by two adjacent pins and the axis of rotation is equal to the angle between adjacent core rods.

Block 223 is also formed with equally radially spaced, equiangularly spaced, tapered recesses 228a, 228b, 228c and 228d. The recesses 228a – 228d are formed so as to receive tapered locating pin 229 (FIG. 8). Pin 229 is actuated to be removed from one of the recesses by air cylinder 230 which is spring loaded to close on release of the air pressure. As shown in FIGS. 9 and 10, locating pin 229 is opposed to recess 228d.

The retraction of locating pin 229 is transmitted by couplings or gearing 231 to drive rod 232 downward, thereby in turn driving coaxial rod 233 downward so that rotary member 234 engages limit switch 235. With the insertion of locating pin 229, the aforesaid mechanism is reversed and rotary member 234 engages limit switch 236. With limit switch 235 tripped the mechanism for rotating the core rod support is now operable. In other words the mechanism comprising elements 231, 232, 233, 234, 235 and 236 is a safety mechanism to ensure that core rod support is free to rotate before actually initiating such rotation.

It is of course understood that in the horizontal movement of the turntable the core rods remain nonrotatable by virtue of pin 229 being inserted in one of the respective recesses, 228a–228d.

With the locating pin 229 retracted, the core rod rotation actuating means 240 is operable to cause rotation of the core rods in union 239.

Core rod rotation actuating mechanism 240 comprises a pivot member 241. Member 241 pivots about pin 242 mounted in vertically movable frame 243. Frame 243 is connected with housing 247. Member 241 is formed with an upper bearing surface 244 for engaging one each of the pins 228a – 228d in moving upward in causing rotation, and a lower bearing surface 245 for engaging one each of the pins 228a – 228d in moving downward in being retracted to begin another incremental rotation of the core rods. In FIG. 9, the lower figure of the member 241 depicts the member at the beginning of the core rod rotation cycle with member 241 in its lowermost position; the upper broken line figure of member 241 depicts the completion of the rotation of the core rods with member 241 in its uppermost position; and the middle figure of member 241 depicts the return or lowering of the member after completion of the one incremental rotation and return to its lowermost position. In FIG. 10, there is depicted the mechanism of FIG. 9 after one incremental rotation of the core rods.

An adjustable stop pin 246 is mounted on frame 243. The foreward edge 247a of pin 246 abuts edge 248 of flange 249 integrally connected as part of member 241. Adjustable pin 246 insures the proper engagement of bearing surface 244 with pin 227a, and further pin 246 prevents counter-clockwise rotation of member 241.

Housing 247 is vertically movable by retractably extensible ram 250 of air cylinder 251. With the extension of ram 210, housing 247, frame 243 and member 241 move vertically upwardly until bearing surface 244 engages a pin 228a – 228d, and with continued upward movement frame 223 rotates 90°. With the 90° rotation, a spring loaded pin 255 engages the pin now occupying the position previously occupied by the pin now engaged by member 241. In FIG. 10, pin 227d occupies the position previously occupied by pin 227a and the edge 256 of pin 255 abuts pin 227d. Pin 255 is mounted to housing 247, and is also mounted to one end 257a of rod 257. Rod 257 is disposed within housing 247 and is pivoted at 257b on pin 258, and the other end 257c of rod 257 is mounted to flange 258a.

With pin 255 abutting pin 227d, spring 257d is compressed and rod end 257a is rotated clockwise about point 257b, and concomitantly rod end 257c is rotated clockwise so that flange 258a trips limit switch 259. Limit switch 259 is interconnected by 239a to valve 260 of the air cylinder 251, so as to cause a release of the air pressure and the vertical retraction or lowering of the housing 247, frame 243, and member 241. With the lowering of member 241, bearing surface 244 is disengaged from pin 227a, and bearing surface 245 engages the top of pin 227d. With continued lowering, the pin 227d causes member 241 to pivot about pin 242, and continues to pivot until member 241 clears pin 227d. After such clearance member 241 under the influence of gravity pivots back to its original position, in preparation for the next rotation of the core rod after the next indexing of the turntable.

Limit switch 259 is also interconnected by line 259b to valve 260 which in turn is connected to line 262 to air probe 261, in turn connected by air line 261a to air cylinder 230. Once the full 90° rotation is completed, limit switch 259 actuates valve 260 to cause the release of air from cylinder 230, permitting the spring insertion of pin 229 in recess 228c, thereby fixing the core rods from further vertical rotation. This action occurs prior to bearing surface 245 engaging pin 227d, as there is a time lag in these actions. Thus when member 241 is in position to pivot clockwise, the core rod support is in fixed position to ensure the proper pivoting action, without movement of the core rods.

Pin 255 after advancing to the stop portion is then lowered to clear pin 227d, and spring 257d expands, thereby reversing the pivoting action of rod 257 and flange 258a disengages from limit switch 259.

With the locating pin 229 in recess 228c, the indexing turntable 211, on signal from the logic circuit (not shown) is then free to horizontally index the core rods to the next station in series. In this manner the electrical system automatically initiates another cycle.

Towards the termination of each indexing, spring loaded rod 270 abuts spring loaded rod 271 and causes member 272 to trip limit switch 273. Limit switch 273 is interconnected by electrical line 274 to air cylinder valve 260, so as to actuate air probes 261 to supply air to air cylinder, so as to in turn actuate the removal or retraction of locating pin 229 from the opposed recess. In this manner, at the termination of the indexing, the core rod support is free to rotate. It is also to be noted that switch 273 is wired in series with another limit switch (not shown) which latter switch indicates the full limit of the incremental horizontal rotation of the core rod mounting 212.

After the core mounting 212 is in its full indexed position and locating pin 229 is retracted, the molds at the injection molding station, preliminary blow station and blow molding station close. Each upper platen at each of the stations upon closing, trips respective limit switches (not shown), signals the electrical circuit. When all mold close limit switches are tripped, a signal is sent to air cylinder valve 251a to actuate air cylinder 251 to extend ram 250 and in turn move frame 243 and member 241 upwardly, so as to actuate the next vertical rotation of the core rods.

The aforesaid operations are of course repeated with each indexing of the turntable.

It is also within the contemplation of this invention to permit the core rods to vertically rotate through more than one position before reinserting the locating pin. As for example it may be desirable to use just two or three of the core rod positions, where shorter temperature conditioning cycles are called for.

Referring now to FIGS. 8 and 9, there is shown the temperature conditioning chamber or plenum 218 with transition extension portion 220. Chamber 218 is formed with a top section 280, a middle section 281 integral with said top section and disposed generally within the plane of the rotatable mounting for the core rods, and a bottom section 282 generally separately mounted from said sections 280 and 281.

The conditioned air supply means to the respective chambers is similar to that as heretofore described in the previous embodiment.

A series of temperature controlled air inlet ports 285 are mounted to top section 280; a second series of air inlet ports 286 are mounted to middle section 281; and a third set of air inlet posts 287 are mounted to bottom section 282. Bottom section 282 is mounted to frame 295 by brackets 296, and sections 280 and 281 are mounted to be supported above the indexing movement elements. A series of air exhaust posts 288 are mounted to chamber portion 289, wherein portion 289 integrally connects top section 280 with middle section 281. A second portion 289a extends outwardly from and is connected to top section 280, but terminates so as to provide clearance for indexing horizontal rotation of the active core rods.

Each section 280, 281 and 282 is formed in the shape of a channel having three contiguous wall portions, as by way of example, wall portions 280a, 280b and 280c of top section 280. This channel, as well as the similar channels for sections 281 and 282, permit the parison covered core rod to pass through a temperature controlled fluid such as air in the chamber during an extended period of travel before undergoing axial stretching and blowing to form the desired article.

At the transition station, extension portion 220, is formed with a cylindrical section 290, and side sections 291 and 292, so as to form a cylindrical channel wherein the core rods are free to rotate. In FIG. 9, the chamber construction elements 280, 281, 282, 289 and 289a are shown as being formed with wall 291. That is, said elements are rearwardly disposed of the rotatable mounting and vertical rotatable movement of the core rods at the transition station. Side sections 291 and 292 have cut out portions such as 291a to permit horizontal rotation of the core rods in the active mode.

In this latter described embodiment the parison covered core rods can undergo an extensive temperature conditioning cycle in that with the first revolution of the turntable, the parison is rotated through section 220 at the transition station into communication with top section 280, and in the next revolution of the turntable, the parison undergoes conditioning in the top section. With the next rotation at the transition station, the said parison is rotated into communication with the middle section 281, and with the next revolution of the turntable the parison undergoes another temperature conditioning through the channel of section 281. Of course the next turntable revolution and rotation brings the parison to the bottom section 282 for still a third period of conditioning, and in the fourth turntable revolution and core rod rotation, the now temperature conditioned parison is returned full circle to the active position for subsequent processing as aforesaid.

Although specific embodiments of the invention have been described, modifications and changes may be made therein without departing from the scope of the invention as defined in the appended claims.

What is claimed is:

1. An injection blow molding apparatus comprising, an indexing turntable for indexing about an axis to a plurality of stations, including an injection station for injection molding parisons onto core rods, a transition station, a blow molding station, and a stripping station, a plurality of core rods for carrying the parisons mounted to said turntable about an axis transverse to the axis of said turntable, said core rods being rotatable about said transverse axis at the transition station, and a plurality of core rods mounted to said turntable at each of the other stations, means to rotate the core rods about the transverse axis at the transition station, whereby one core rod is rotated to a temperature conditioning operation, and a second core rod is simultaneously rotated from a temperature conditioning operation to the place occupied by said one core rod, and a third core rod is simultaneously rotated from one conditioning operation to another conditioning operation, said means to rotate the core rods being actuated so as to rotate the core rods in the same direction so that each core rod undergoes one complete 360° rotation about the transverse axis at the transition station.

2. The injection blow molding apparatus of claim 1, wherein said core rods are freely rotatable when indexed at the transition station and means to prevent rotation of the core rods at said other stations.

3. The injection blow molding apparatus of claim 1, further comprising parison temperature conditioning means being formed within the plane of the transverse axis and of rotation of the turntable.

4. The injection blow molding apparatus of claim 3, further comprising parison temperature condition means being formed at the top and bottom of said rotatable mounting.

5. The injection blow molding apparatus of claim 1, further comprising means to actuate rotation of the core rods at the transition station with each indexing of the turntable.

6. The injection blow molding apparatus of claim 5, said means to actuate rotation comprising means to disengage a stop pin from a rotatable mounting for the core rods so as to permit said core rods to rotate.

7. The injection blow molding apparatus of claim 5, further comprising means to limit the rotation to an angle equal to the angle between adjacent core rods.

8. The injection blow molding apparatus of claim 6, further comprising means to engage the stop pin after rotating through an angle equal to the angle between adjacent core rods.

9. An injection blow molding apparatus, comprising an indexing turntable for indexing at a plurality of stations, including an injection station for injection molding a parison on a core rod, a preliminary blow station for partially blowing the parison, a transition station for moving the parison to and from a temperature conditioning operation to bring the parison to its orientation temperature, a parison stretching station for orienting said parison, a blow molding station for forming the article, and a stripping station for removing the blown article, a plurality of core rods for carrying the parisone mounted to said turntable about an axis transverse to the axis of said turntable, said core rods being rotatable about said transverse axis at the transition station and a plurality of core rods at each of the other stations, means to rotate the core rods about the transverse axis at the transition station, whereby one core rod is rotated to temperature conditioning operation, and a second core rod is simultaneously rotated from the temperature conditioning operation, to the place occupied by said one core rod, and a third core rod is simultaneously rotated from one conditioning operation to another conditioning operation, said means to rotate the core rods being actuated so as to rotate the core rods in the same direction so that each core rod undergoes one complete 360° rotation about the transverse axis at the transition station.

10. The apparatus of claim 1, said means to rotate the core rods comprising a pin extending outwardly from and mounted on the rotatable mounting for said core rods, and a member being formed with a bearing surface to engage said pin, means to move said member to engage said pin and with continued movement rotate said core rods.

11. The apparatus of claim 10, said member being movable in a direction transverse to the axis of core rod rotation.

12. The apparatus of claim 11, said member being rotatable about an axis parallel to the axis of rotation of the core rods and being formed with a second bearing surface which engages a second pin, and said member being rotatable to clear said rotatable core rods to return to position for the next core rod rotation.

13. The apparatus of claim 10, further comprising a plurality of pins, one pin being mounted for each rotation of the core rods.

14. The apparatus of claim 13, said pins rods being equally radially disposed from the axis of rotation of the core rods.

15. The apparatus of claim 14, said pins being equiangularly spaced one from the other.

16. The apparatus of claim 9, further comprising parison temperature conditioning means being formed within the plane of the transverse axis and of rotation of the turntable.

17. The apparatus of claim 16, further comprising parison temperature condition means being formed at the top and bottom of said rotatable mounting.

* * * * *